(12) United States Patent
Johnson et al.

(10) Patent No.: US 10,507,979 B2
(45) Date of Patent: Dec. 17, 2019

(54) OBJECT TRANSPORTATION WITH V-SHAPED ATTACHMENT DEVICES

(71) Applicant: Hewlett-Packard Development Company, L.P., Houston, TX (US)

(72) Inventors: Bruce G Johnson, LaCenter, WA (US); Elliott Downing, Vancouver, WA (US); Steven P Downing, Camas, WA (US); Richard Lee Brinkly, Camas, WA (US); Kevin Bensel, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/759,933

(22) PCT Filed: Dec. 9, 2015

(86) PCT No.: PCT/US2015/064752
§ 371 (c)(1),
(2) Date: Mar. 14, 2018

(87) PCT Pub. No.: WO2017/099756
PCT Pub. Date: Jun. 15, 2017

(65) Prior Publication Data
US 2018/0251307 A1     Sep. 6, 2018

(51) Int. Cl.
*B65G 15/44* (2006.01)
*B65G 17/42* (2006.01)
*B65G 15/58* (2006.01)
*B65G 17/00* (2006.01)

(52) U.S. Cl.
CPC ............. *B65G 15/44* (2013.01); *B65G 15/58* (2013.01); *B65G 17/002* (2013.01); *B65G 17/42* (2013.01)

(58) Field of Classification Search
CPC ...... B65G 17/002; B65G 17/42; B65G 17/12; B65G 15/42; B65G 15/44; B65G 15/58
USPC ............ 198/867.01, 867.02, 867.11, 867.14, 198/867.15, 699, 690.2, 867.06
See application file for complete search history.

(56) References Cited

U.S. PATENT DOCUMENTS

| | | | | |
|---|---|---|---|---|
| 3,848,731 | A * | 11/1974 | Wiese | .................. B65G 17/42 198/618 |
| 3,981,390 | A * | 9/1976 | Richard | ............... A01D 34/831 198/690.2 |
| 4,084,681 | A | 4/1978 | Siemens | |
| 5,611,632 | A * | 3/1997 | Hiramatsu | ............. B41J 19/005 347/37 |

(Continued)

FOREIGN PATENT DOCUMENTS

| | | |
|---|---|---|
| JP | 0647978 | 2/1994 |
| JP | 11314419 | 11/1999 |
| JP | 2015061174 | 3/2015 |

*Primary Examiner* — James R Bidwell
(74) *Attorney, Agent, or Firm* — Fabian VanCott (57) ABSTRACT

In one example in accordance with the present disclosure an object transportation device is described. The device includes a continuous belt having an inner surface and an outer surface. The inner surface interacts with a belt transport system. The device also includes a number of attachment devices disposed on the outer surface of the belt. An object attaches to the belt via an attachment device. An attachment device includes two angled protrusions extending from the outer surface from a common joint.

13 Claims, 9 Drawing Sheets

(56) References Cited

U.S. PATENT DOCUMENTS

| | | | |
|---|---|---|---|
| 6,209,716 B1 | 4/2001 | Bogle et al. | |
| 6,321,904 B1 | 11/2001 | Mitchell | |
| 6,443,552 B1 | 9/2002 | Canon | |
| 6,695,135 B1 * | 2/2004 | Lapeyre | B65G 17/08 198/690.2 |
| 7,124,879 B1 | 10/2006 | Maguire | |
| 7,611,224 B2 | 11/2009 | Tsuyama | |
| 7,954,630 B2 * | 6/2011 | Williams | B29C 65/02 198/690.2 |
| 2002/0190418 A1 | 12/2002 | Jens et al. | |
| 2013/0056332 A1 | 3/2013 | Cavina | |

\* cited by examiner

OBJECT TRANSPORTATION WITH V-SHAPED ATTACHMENT DEVICES

BACKGROUND

Belts are used in many aspects of society. For example, rubber belts, and belts of other materials, are passed over and around rollers. The rollers are coupled to a motor. As the rollers spin or rotate, an interface force between the rollers and the belt cause the belt to move along a belt path. These belts can be used to transport objects around a path followed by the belt.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As described above, many devices rely on belts to move components along a particular path. For example, conveyer belts are used to move dirt or other matter from one point to another. In another example, belts are used in printers to move paper from one location to another. To effectuate this movement, objects such as rods, buckets, or other components are coupled to the belt. As the belt rotates around a belt path defined by belt rollers, the objects on the belt also move along the belt path.

To carry out such movement, an attachment device on the belt is used to couple the object to the belt. A coupler is joined to the attachment device, which coupler facilitates the coupling of the object to the belt such that the object moves along with the belt. While such belt to object attachment is desirable, some complications effect its practical implementation in many fields.

For example, belts, which may be rubber, can be formed in a mold. Due to the constraints of the molding process, the shape of the attachment device is limited by an opening of the mold, i.e., the attachment device is limited in the magnitude of "undercut" features. Such an undercut feature may prevent the device from being extracted from the mold or damage the undercut feature so that it is outside of operation specifications. This limitation may affect the strength of the attachment between the coupler and the attachment device of the belt. For example, as will be described below in reference to the figures, an undercut may improve the mechanical interference between an object and the attachment mechanism. Accordingly, the limitations in forming an undercut feature using molding techniques, reduces the mechanical interference of the attachment device and the coupler. The reduced mechanical interference increases the risk that low forces can separate the coupler (and corresponding object) from the belt. While some solutions have been presented, these solutions require additional operations to secure the coupler to the belt and therefore increase manufacturing complexity and cost.

The present specification describes a device and system that alleviate these and other complications. Specifically, the present specification describes an attachment device that has a geometry which 1) can be formed using molding methods and 2) provide for a stronger coupling force between the belt and any adjoined coupler. In other words, the geometry of the attachment device described herein provides mechanical interference such that an attached coupler is less likely to decouple from the belt. The attachment device may be V-shaped, having protrusions that angle away from one another and that share a joint to the belt. While having an undercut feature, the space between protrusions of the V-shaped attachment device allow for deflection during removal of the attachment device from a mold. In this fashion, the protrusions of the V-shaped attachment device deflect when being removed from the mold yet provide the enhanced hold of a more substantial undercut design.

More specifically, the present specification describes an object transportation device. The device includes a continuous belt having an inner surface and an outer surface. The inner surface is to interact with a belt transport system. The device also includes a number of attachment devices disposed on the outer surface of the continuous belt. An object attaches to the belt via an attachment device. An attachment device includes two angled protrusions extending from the outer surface from a common joint.

The present specification also describes an object transportation system. The system includes a number of rollers to move a continuous belt along a belt path. A roller includes a number of roller teeth. The system also includes the continuous belt that passes over the number of rollers. The belt includes an inner surface having a number of belt teeth to interact with the number of roller teeth to move the continuous belt along the belt path. The belt includes an outer surface. The outer surface includes a number of V-shaped attachment devices to interact with a number of objects and move the number of objects along the belt path.

The present specification also describes a method for forming a continuous belt with V-shaped attachment devices. According to the method, a space between an inner portion of a mold and an outer portion of a mold is filled with a material to form a number of continuous belts with V-shaped attachment devices. The outer portion of the mold includes a number of V-shaped portions to define the V-shaped attachment devices. The inner portion of the mold is removed and the material is removed from the outer portion by deforming the material inward. In removing the material, protrusions of the V-shaped attachment devices deflect inward to facilitate removal from the V-shaped portion of the outer portion.

Certain examples of the present disclosure are directed to systems and methods for transporting an object along a belt path that 1) provide enhanced mechanical interaction to secure the object to the belt; 2) facilitate simultaneous manufacture of multiple belts; 3) are formed using molding techniques; and 4) are cost-effective and simple to manufacture. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

As used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Figure 1:
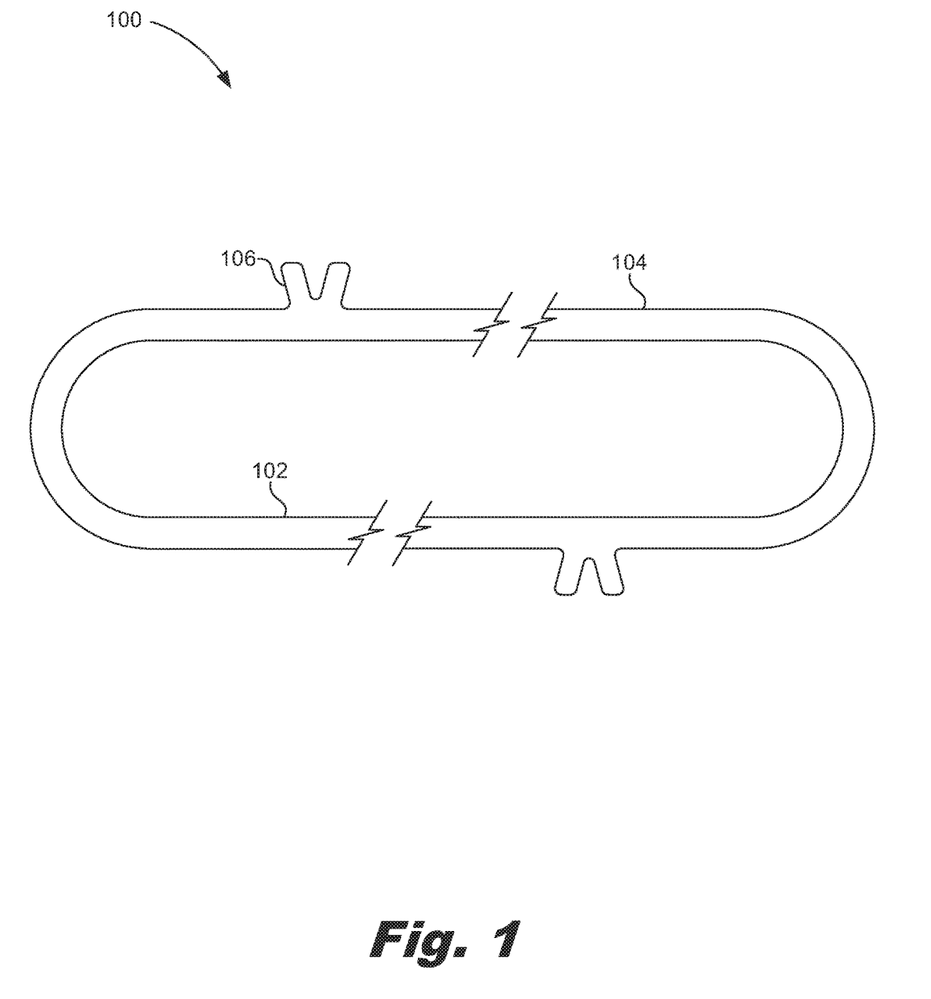
FIG. 1 is an example of an object transportation device with a continuous belt with V-shaped attachment devices disposed thereon, according to one example of the principles described herein.

Turning now to the figures, FIG. 1 is an example of an object transportation device with a continuous belt (100) with V-shaped attachment devices (106) disposed thereon, according to one example of the principles described herein.

As described, the device includes a continuous belt (100). A continuous belt (100) is one that has no end, and is a continuous shape. The continuous belt (100) may be formed of any material. For example, the continuous belt (100) may be made of a compliant material, a compliant material being one that undergoes elastic deformation when subjected to an applied force. Put another way, a compliant continuous belt (100) may bend, stretch, or otherwise elastically deform without breaking in the presence of stress, up to a certain threshold. In some examples the continuous belt (100) may be made up of joined segments The continuous belt (100) may be used in many applications. For example, the continuous belt (100) could be used as a conveyer belt in excavation to move dirt or other matter from one location to another. In another example, the continuous belt (100) could be used in a printer for moving media such as paper from one location to another. In summary, the continuous belt (100), while described in this specification as applying to a few specific explicit fields, can be used in any field.

The continuous belt (100) includes an inner surface (102). The inner surface (102) interacts with a belt transport system to move the continuous belt (100). For example, the belt transport system may include a number of rollers that have a groove. The cross section of the inner surface (102) of the continuous belt (100) may form a geometry that corresponds to and sits in the groove. As a rotational force is applied to the rollers, a friction force at the groove and the inner surface (102) causes the entire continuous belt (100) to rotate along a belt path, the belt path being defined as the path a belt travels around a belt transport system.

The device also includes a number of attachment devices (106) disposed on an outer surface (104) of the continuous belt (100). Via the attachment devices (106) objects such as paper transport rods or material buckets may be attached. Then, as the belt (100) and the attachment devices (106) move around the belt path, the objects attached to the belt (100) via the attachment devices (106) also move around the belt path.

An attachment device (106) is formed of two angled protrusions that angle away from one another and extend away from the outer surface (104) from a common joint. In other words, the attachment device (106) is a V-shaped attachment device (106). More specific detail regarding the attachment device (106) is provided below in connection with FIGS. 2A and 2B. While FIG. 1 depicts two attachment devices (106), the device may include any number of attachment devices (106) disposed along the outer surface (104) of the continuous belt (100).

Figure 7A:
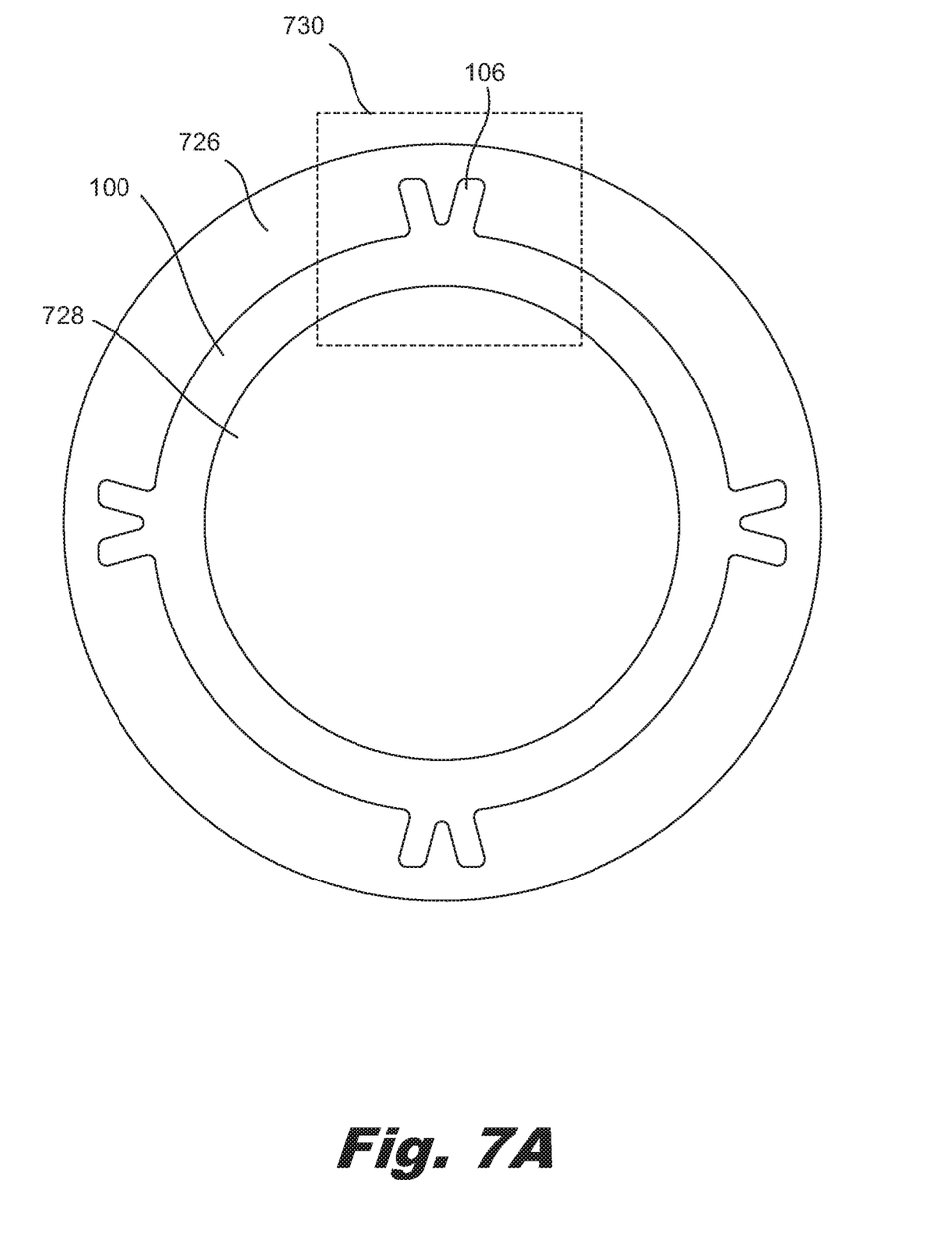
FIGS. 7A and 7B depict the removal of a continuous belt from a mold, according to one example of the principles described herein.
Figure 7B:
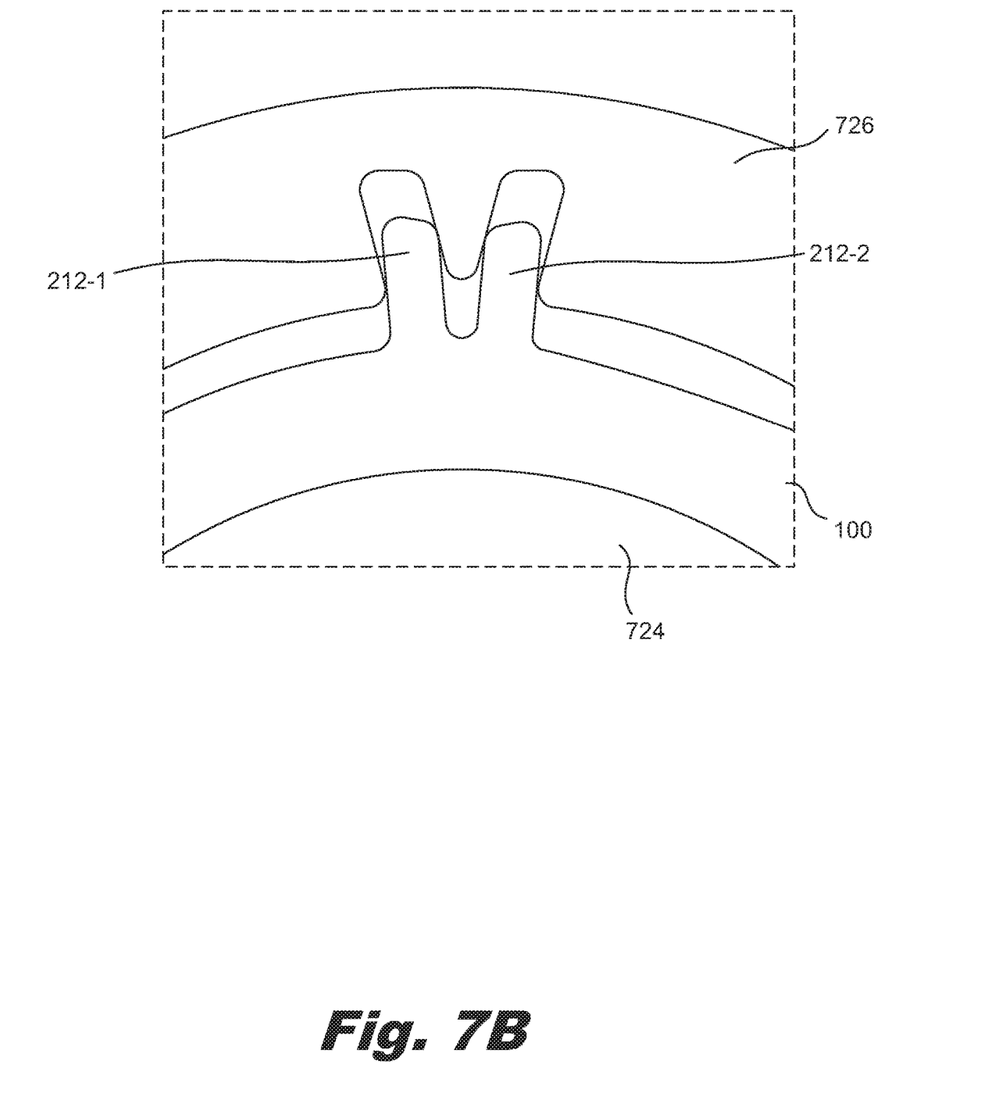

The V-shaped attachment devices (106) as described herein may facilitate a more secure coupling of an object to the belt (100) due to the increased mechanical interference generated against the object by the protrusions of the V-shaped attachment device (106). Such a coupling is illustrated in FIGS. 4A-5B. Moreover, as the outer surface (104) is formed via an outer portion of a mold, the V-shaped attachment device (106) may be manufactured using a molding operation as the protrusions of the V-shaped attachment device (106) deflect through the opening of the mold. Such deflection and removal from a mold is illustrated in FIGS. 7A-7B.

Figure 2A:
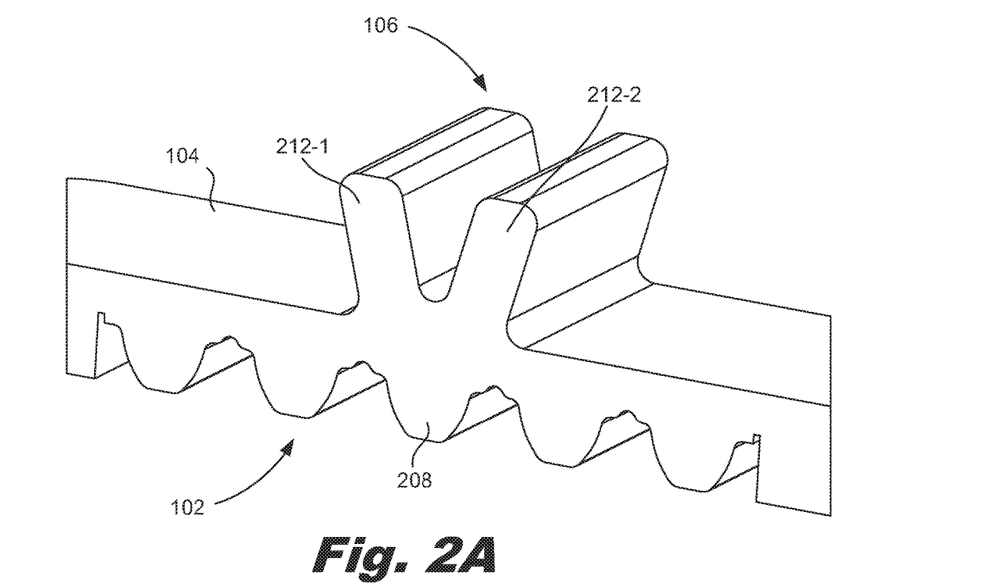
FIGS. 2A and 2B are examples of attachment devices of the object transportation device, according to one example of the principles described herein.
Figure 2B:
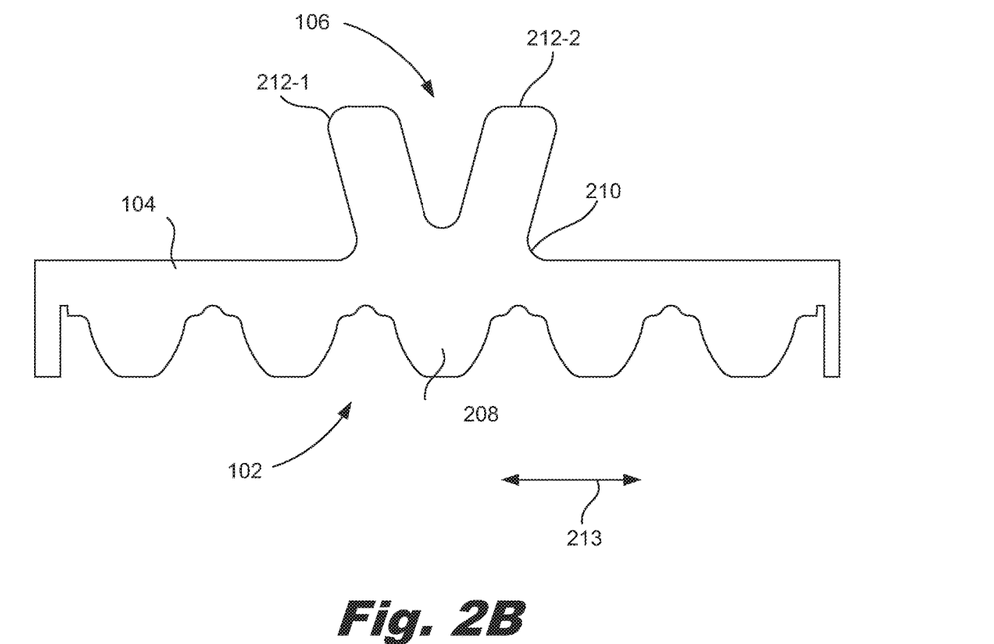

FIGS. 2A and 2B are examples of an attachment device (106) of the object transportation device, according to one example of the principles described herein. Specifically, FIG. 2A is a perspective view of one attachment device (106) disposed on the outer surface (104) of the continuous belt (FIG. 1, 100) and FIG. 2B is a front view of the attachment device (106). As described above, the inner surface (102) of the continuous belt (FIG. 1, 100) interacts with a belt transport system. To this end, the inner surface (102) may include a number of belt teeth (208) to interact with the belt transport system. For example, the belt transport system may include rollers that have roller teeth that correspond to, and enmesh with, the belt teeth (208) to transfer motion from a motor to the belt (100) via the roller. For simplicity, in FIGS. 2A and 2B a single instance of a belt tooth (208) is indicated with a reference number. Belt teeth (208) may reduce the likelihood of slippage between the belt (FIG. 1, 100) and the belt transport system.

The attachment device (106) in some examples, aligns with a tooth (208) of the belt (FIG. 1, 100). For example, as depicted in FIGS. 2A and 2B, the location where the V-shaped attachment device (106) protrudes from the outer surface (104) aligns with one of the teeth (208) that protrudes from the inner surface (102). Moreover, a common joint (210) of the attachment device (106), i.e., the juncture between the attachment device (106) and the outer surface (104) may be the same width as the tooth (208). As described above, the V-shaped attachment device (106) includes two angled protrusions (212-1, 212-2) that angle away from one another and share a common joint (210), the common joint (210) being the location where the attachment device (106) joins the outer surface (104) and from which the protrusions (212-1, 212-2) extend. Making the width of the common joint (210) the same as the width of the tooth (208) and aligning the common joint (210) with the tooth (208) reduces the impact of the attachment device (106) on the flexibility of the belt (FIG. 1, 100). For example, the greater the width of the common joint (210), the greater the stiffness of the belt (FIG. 1, 100). Accordingly, a common joint (210) that has the same width as the tooth (208) negligibly increases the stiffness of the belt (FIG. 1, 100) from the stiffness imposed by the width of the tooth (208). Moreover the alignment of the attachment device (106) and the tooth (208) provides better motion of the belt (100) around rollers such as pulleys.

As can be seen in FIGS. 2A and 2B in some examples, the attachment device (106) is integrally attached to the continuous belt (FIG. 1, 100). In other words, the attachment device (106) and the continuous belt (FIG. 1, 100) are molded out of the same material and molded at the same time so as to provide a constant matrix of material between the two. Doing so simplifies the manufacturing process of the belt (FIG. 1, 100) as well as increasing the strength of the common joint (210). Accordingly, both the belt (FIG. 1, 100) and the attachment device (106) may be formed out of a compliant material such as vulcanized rubber. While specific reference is made to a vulcanized rubber, the belt (FIG. 1, 100) and/or attachment device (106) may be formed of any material. Moreover, while specific reference is made to a belt (100) and an attachment device (106) that are formed out of the same material, the attachment device (106) may be formed of a different material from the belt (FIG. 1, 100).

The width of the protrusions (212-1, 212-2) may be less than half a width of the common joint (210). When used in the present specification, the term width refers to a direction indicated by the arrow (213) in FIG. 2B. Protrusions (212-1, 212-2) with a width that is less than half of the width of the common joint (210) facilitates the deflection of the protrusions (212-1, 212-2) upon removal from the mold that forms the belt (FIG. 1, 100). The height of the protrusions (212-1, 212-2), the angle between the protrusions (212-1, 212-2), and the angle between the protrusions (212-1, 212-2) and the outer surface (104) may be selected to balance ease of removal from a mold and an ability to hold a corresponding coupler to the associated attachment device (106).

An attachment device (106) having the geometry described herein, i.e., a V-shaped attachment device (106), allows the individual protrusions (212-1, 212-2) to deflect upon removal from a mold. In other words, a V-shaped attachment device (106) may have a similar holding effect as an undercut attachment but can be molded using molding techniques. In other words, if the attachment device (106) were solid, in a dove-tailed shape, then the device (106) would not be easily removed from a mold and thereby increase the complexity and cost of manufacturing. However, as the V-shaped protrusions (212-1, 212-2) deflect upon removal, the increased mechanical interference between the attachment device (106) and a coupler is allowed, while allowing simple removal of the belt (FIG. 1, 100) from a mold. Moreover, using a V-shaped attachment device (106), secondary operations for providing a secure attachment point are alleviated.

Figure 3:
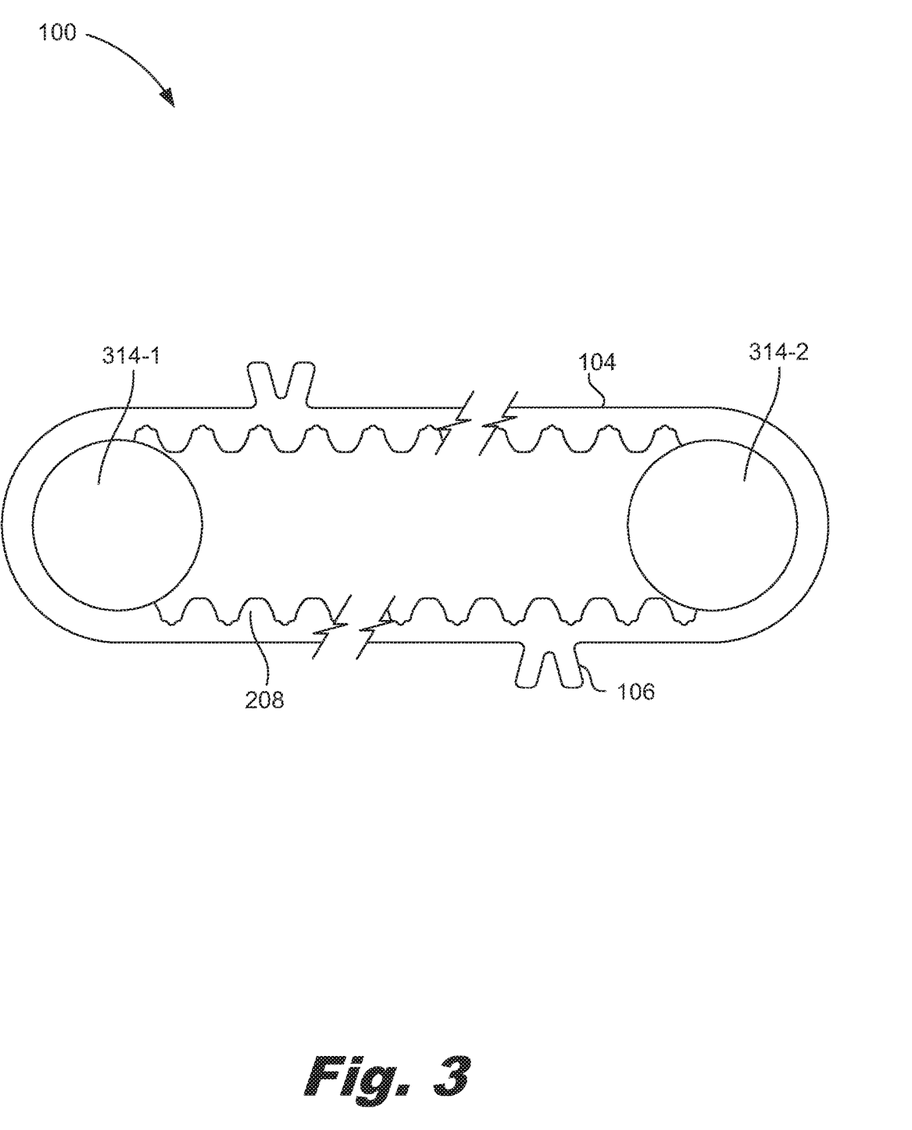
FIG. 3 is an example of an object transportation system with a continuous belt with V-shaped attachment devices disposed thereon, according to one example of the principles described herein.

FIG. 3 is an example of an object transportation system with a continuous belt (100) with V-shaped attachment devices (106) disposed thereon, according to one example of the principles described herein. The system also includes a number of rollers (314-1, 314-2) to move a continuous belt (100) along a belt path. While FIG. 3 depicts two rollers (314-1, 314-2), any number of rollers (314) may be found within the system to define a belt path. The rollers (314-1, 314-2) are rotated via some energy source and cause the belt (100) to move. The rollers (314) therefore have a component that transfers the rotational motion of the rollers (314) to the belt (100). For example, a cross section of the belt (100) may fit within a groove on the rollers (314). In another example, as depicted in FIG. 3, the belt (100) may include a number of belt teeth (208) that interact with roller teeth on the roller (314). Belt teeth and roller teeth that enmesh one with another to impart motion one to another enhance the transfer of energy and reduce the likelihood of slippage between the belt (100) and the rollers (314).

The system also includes the continuous belt (100) with its inner surface (FIG. 1, 102) and belt teeth (208) to interact with the roller teeth and the outer surface (104) with attached V-shaped attachment devices (106). As an object is attached to the continuous belt (100) via the V-shaped attachment devices (106), the object is also moved along the belt path.

As described above, the continuous belt (100) and the system it is used in could be used in any number of devices, not limited to industrial size applications such as earth movement and smaller application such as within a printer. When used in a printer, the object may be a clamp that as it moves along the belt path catches an edge of a print media such as paper and moves it to a different location. In another example, when used in a printer the object may be an elevation device to lift media. Still other examples include objects that facilitate picking media from a tray or controlling output tray features.

The system as described herein may be used in any device where objects or materials are moved along a belt path and as described above. Moreover, the V-shaped attachment devices (106) can be produced with a simple low coast manufacturing operation all while affording a secure attachment of an object to the continuous belt (100).

Figure 4A:
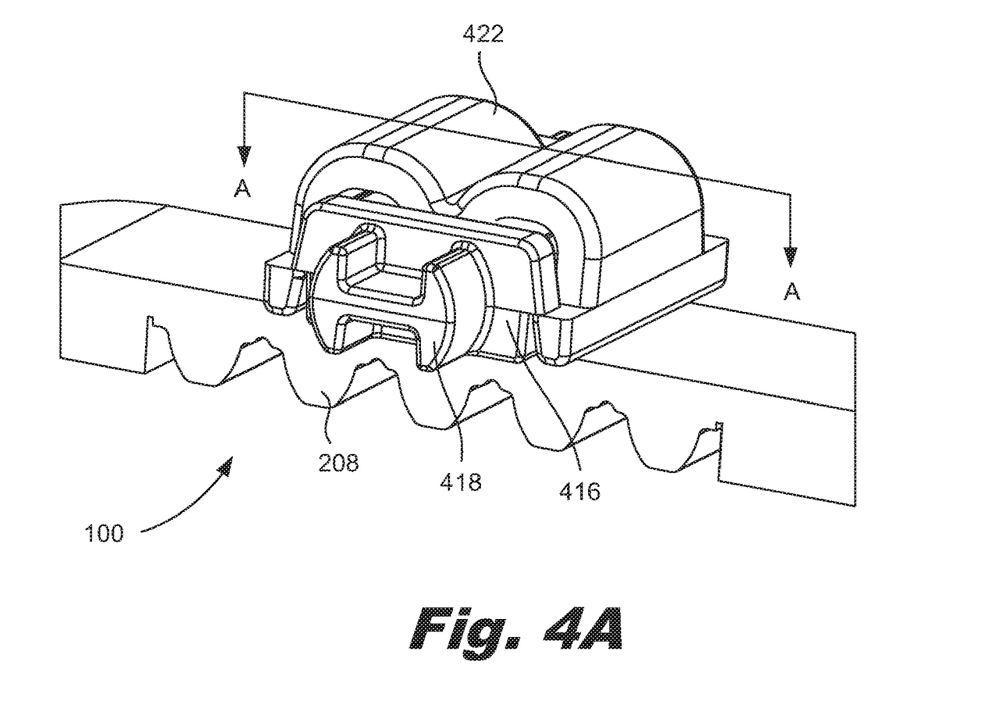
FIGS. 4A and 4B are examples of couplers of the object transportation system, according to one example of the principles described herein.
Figure 4B:
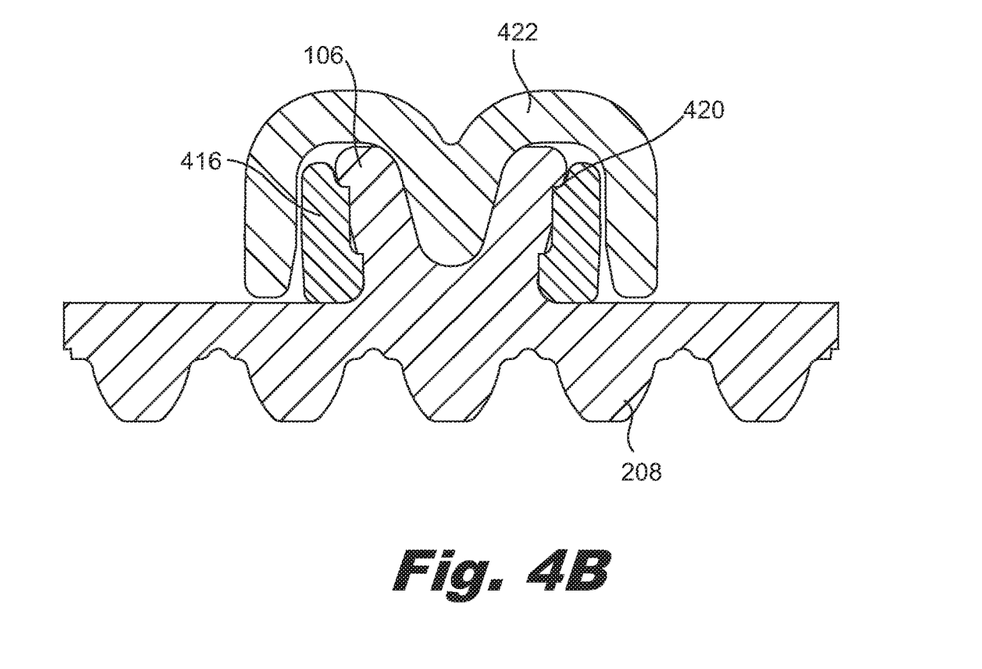

FIGS. 4A and 4B are examples of a coupler (416) of the object transportation system, according to one example of the principles described herein. Specifically, FIG. 4A is a perspective view of the coupler (416) attached to a belt (100) via the attachment device (106) and FIG. 4B is a cross-sectional view of the coupler (416) taken along the line 'A'. In FIG. 4B, the cross-hatching is not meant to impart any specific material properties to the different components, but is used to distinguish between different components.

As described above, the system, and specifically, the attachment devices (106) are used to couple objects to the belt (100) such that the object moves along the belt path, the object being such things as material movers, buckets, paper moving clamps, etc. To this end, the system includes a coupler (416) to removably join an object to the V-shaped attachment device (106). To removably join means that an object can be coupled to the attachment device (106) and belt (100) but can also be removed, for example for repair or replacement of the object.

The coupler (416) has a shape to surround the protrusions (FIG. 2, 212) of the V-shaped attachment device (106). In addition to surrounding the V-shaped attachment device (106) protrusions (FIG. 2, 212), the coupler (416) exerts an inward force against the V-shaped attachment device (106) to retain the coupler (416) against the attachment device (106). The coupler (416) is sized such that the internal force deflects the protrusions (FIG. 2, 212) of the attachment device (106) inward creating a mechanical interference between the coupler (416) and the attachment device (106), which mechanical interference provides the holding power of the coupler (416) to the attachment device (106). To further secure the coupler (416) to the attachment device (106), the coupler (416) may include a number of ridges (420). As the coupler (416) exerts an inward force against the attachment device (106) the ridges (420) protrude into the attachment device (106) to maintain the coupler (416) and the attachment device (106) together and to prevent their relative movement. For example, during use, the coupler (416) and corresponding object may have a tendency to pull upward off of the attachment device (416). The ridges (420) reduce or prevent this upward motion.

The coupler (416) also includes an object attachment device (418). The object attachment device (418) is a connection point to the object being transported along the belt path. Accordingly, the coupler (416) and the corresponding object attachment device (418) couple the object to the belt (100). The object attachment device (418) may allow the object to rotate about a longitudinal axis of the object attachment device (418).

In some examples, as depicted in FIGS. 4A and 4B, the system also includes a securing device (422) to further secure the coupler (416) to the attachment device (106). The securing device (422) encompasses the coupler (416) and the attachment device (106). When positioned such, the securing device (422) has a V-shaped protrusion that fits between the protrusions (FIG. 2, 212) of the attachment device (106). The V-shaped protrusion of the securing device (422) exerts an outward force against the protrusions (FIG. 2, 212). In other words, the V-shaped protrusion of the securing device (422) exerts an outward force on the protrusions (FIG. 2, 212) of the attachment device (106), while the coupler (416) exerts an inward force on the protrusions (FIG. 2, 212). These two forces serve to pinch the V-shaped attachment device (106) protrusions (FIG. 2, 212) thus securing the couplers (416) attachment thereto.

The securing device (422) also contributes to the inward force exerted against the protrusions (FIG. 2, 212). For example, arms of the securing device (422) extend down the outside of the V-shaped attachment device (106) and surround the V-shaped attachment device (106) and the coupler (416). These arms exert an inward force against the V-shaped attachment device (106) protrusions (FIG. 2, 212) thus further increasing the holding force of the coupler (416). Accordingly, in this example, mechanical retention of the coupler (416) to the belt (100) is enhanced as there is mechanical interference on four sides, i.e., an inside and an outside of both protrusions (FIG. 2, 212) of the attachment device (106).

The coupler (416) and securing device (422) of the present specification allow for a removable coupling of an object to the belt (100). Also, the system provides a secure attachment via the mechanical interference between V-shaped attachment device (106) and the coupler (416) and securing device (422).

Figure 5A:
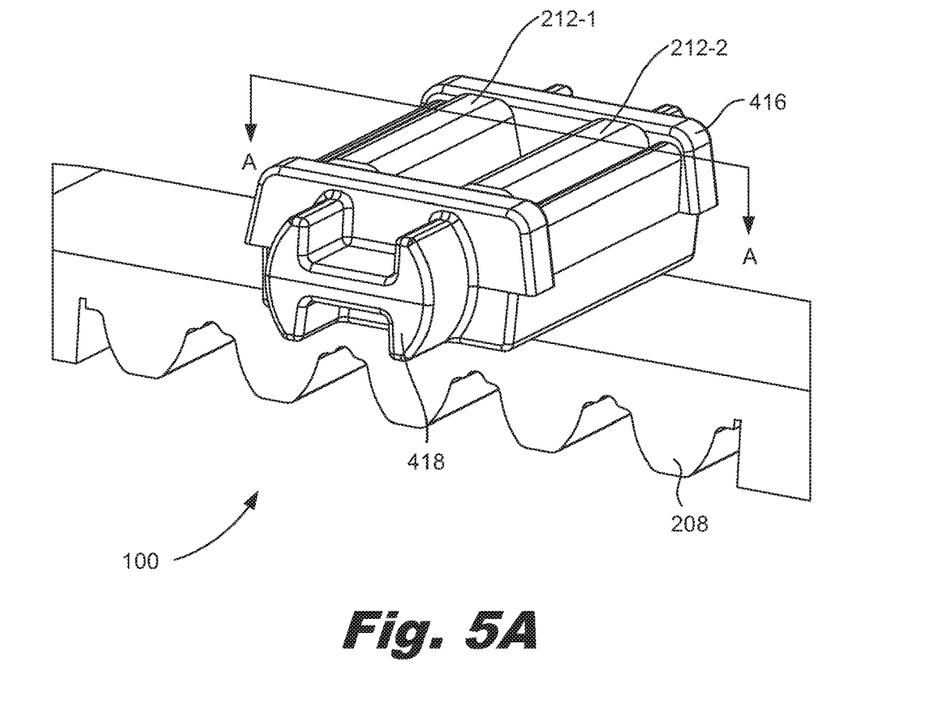
FIGS. 5A and 5B are examples of couplers of the object transportation system, according to another example of the principles described herein.
Figure 5B:
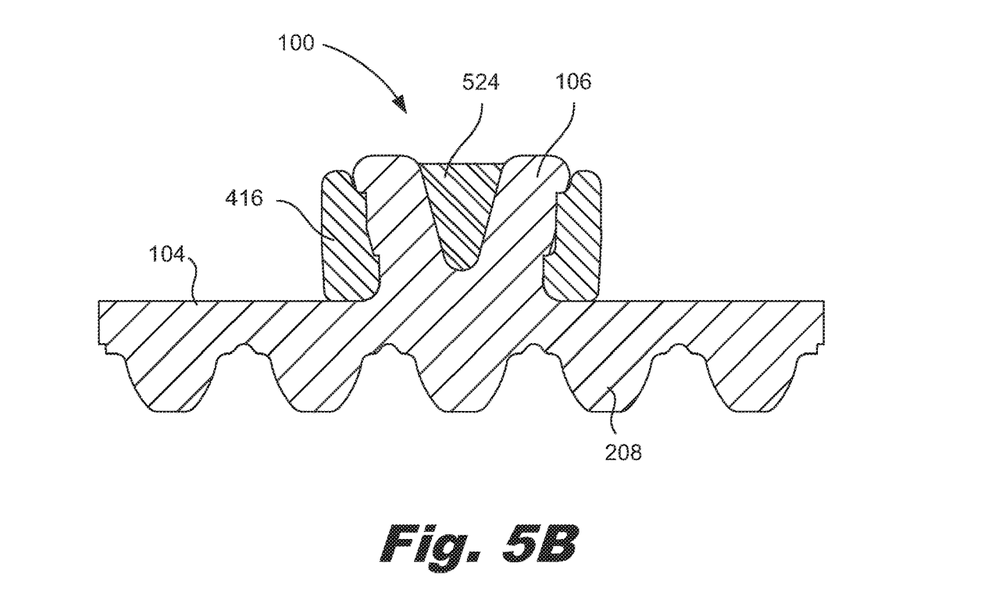

FIGS. 5A and 5B are examples of couplers (416) of the object transportation system, according to one example of the principles described herein. Specifically, FIG. 5A is a perspective view of the coupler (416) attached to a belt (100) via the attachment device (106) and FIG. 5B is a cross-sectional view of the coupler (416) taken along the line 'A'. In FIG. 5B, the cross-hatching is not meant to impart any specific material properties to the different components, but is used to distinguish between different components. FIG. 5A clearly depicts the coupler (416) surrounding the protrusions (212-1, 212-2) of the V-shaped attachment device (106).

While FIGS. 4A and 4B depicted a securing device (FIG. 4, 422), in some examples another component may be used. For example, the system may include a spacing device to maintain an angle between the protrusions (212-1, 212-2) of the V-shaped attachment device (106). For example, as depicted in FIG. 5B, an adhesive (524) may be placed between the protrusions (212-1, 212-2) so as to maintain the angle between them. As with the securing device (FIG. 4, 422), the adhesive (524) prevents the protrusions (212-1, 212-2) from deflecting inward in response to the inward force from the coupler (416). Were the protrusions (212-1, 212-2) allowed to deflect inward, the mechanical interference between the coupler (416) and the V-shaped attachment device (106) would be reduced, thereby reducing the holding strength of the attachment device (106). While FIG. 5B specifically depicts an adhesive (524) any sort of spacing device may be used such as rods or other supports, to maintain the angle.

Using an adhesive (524) between the protrusions (212-1, 212-2) of the V-shaped attachment device (106), similar to the securing device (FIG. 4, 422) increases the hold of the attachment device (106) as there are more surfaces through which mechanical retention is used on. Moreover, using adhesive (524) not only provides a mechanical interference, but also provides for adhesion in addition to the mechanical interference.

The use of an adhesive (524) or other spacing device also centers the coupler (416) on the attachment device (106) and re-centers the coupler (416) in the presence of an external force. For example, if a force draws the coupler (416) away from the attachment device (106), i.e., a vertical direction in FIG. 5B, the angle of the protrusions (212-1, 212-2) as well as their inability to deflect inward due to the presence of the adhesive (524), would re-seat the coupler (416) against the belt (100). In other words, a fully seated coupler (416) is the lowest energy state for the system and as such once a force is removed, the system will return to this lowest energy state.

Figure 6:
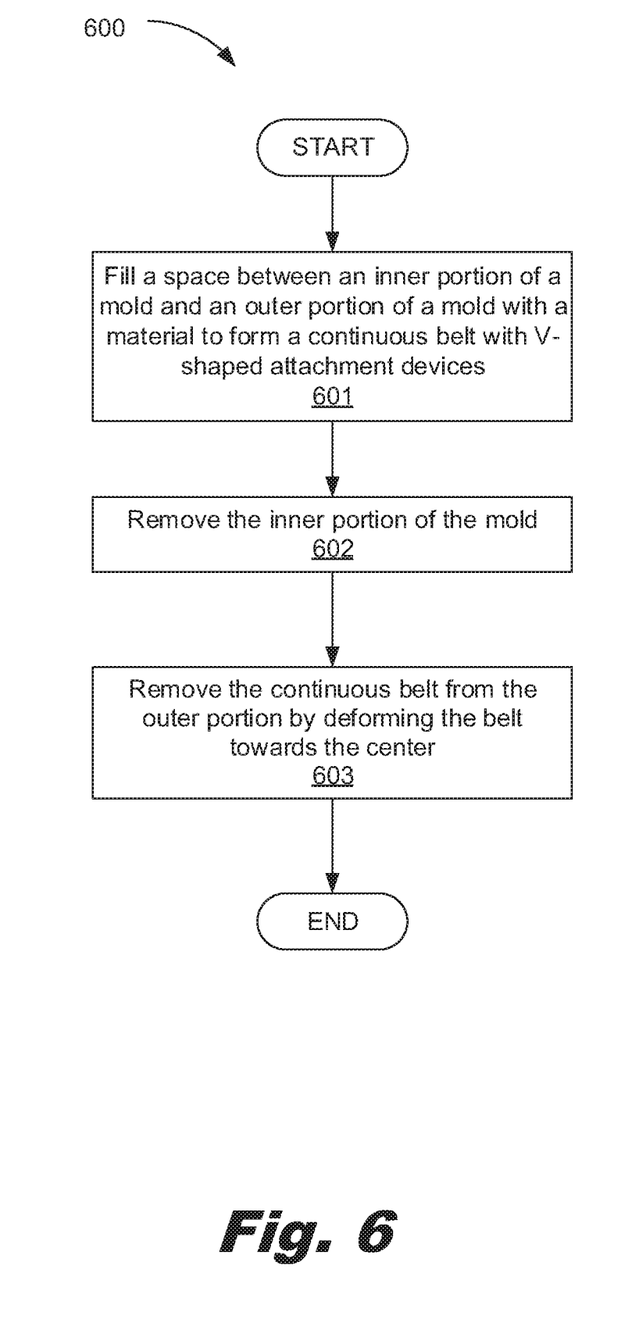
FIG. 6 is a flowchart of a method for forming a continuous belt with V-shaped attachment devices, according to one example of the principles described herein.

FIG. 6 is a flowchart of a method (600) for forming a continuous belt (FIG. 1, 100) with V-shaped attachment devices (FIG. 1, 106), according to one example of the principles described herein. In forming the belt (FIG. 1, 100) a mold having an inner portion and an outer portion may be used. The portions may have a circular cross section and be a certain length. The length of the mold may be such that multiple belts (FIG. 1, 100) can be simultaneously formed from a single mold. Accordingly, to form the belt (FIG. 1, 100), a space between the inner portion and the outer portion is filled (block 601) with a material. For example, a liquid or semi-liquid rubber may be poured between the inner portion and the outer portion. The material is what will form the belt (FIG. 1, 100). The outer portion of the mold has a number of V-shaped recessions that define the V-shaped attachment devices (FIG. 1, 106). An example of the mold is provided below in FIGS. 7A and 7B.

After the material is poured in, and allowed to cure, the inner mold is removed (block 602) leaving a space on the inside of the belt (FIG. 1, 100). Once the inner mold is removed (block 602), the material is removed (block 603). Specifically, the continuous belt (FIG. 1, 100) is deflected inward towards the center of the belt (FIG. 1, 100) that was previously occupied by the inner mold. In so doing, the protrusions (FIG. 2, 212-1, 212-2) of the V-shaped attachment device (FIG. 1, 106) are sufficiently compliant to deflect inward to retreat out of the opening. Once out of the opening, the protrusions (FIG. 2, 212-1, 212-2) return to their original shape, i.e., having an angle between them as defined by the V-shaped recession of the outer mold.

The method (600) of formation allows for an attachment device (FIG. 1, 106) with strong holding power to be formed without secondary operations and without complex molding operations. For example, while the V-shaped portion, and thereby the V-shaped attachment device (FIG. 1, 106) has an undercut, meaning the width the V-shaped portion is greater at its top than at its opening, the protrusions (FIG. 2, 212-1, 212-2) deflect so as to easily come out of the mold, while still providing the enhanced holding afforded by the angle of the protrusions (FIG. 2, 212-1, 212-2).

FIGS. 7A and 7B depict the removal of a continuous belt (100) from the mold, according to one example of the principles described herein. As described above, the mold includes an outer portion (726) that has V-shaped recessions that are used to shape the V-shaped attachment devices (106). While FIG. 7A depicts four V-shaped attachment devices (106), any number of V-shaped attachment devices (106) may be formed by the mold. The mold also includes the inner portion (728) that forms the inner surface (FIG. 1, 102) of the continuous belt (100). As described above, the inner surface (FIG. 1, 102) may include a number of belt teeth (FIG. 2, 208). Accordingly, the inner portion (728) of the mold can include portions that define those teeth (FIG. 2, 208).

FIG. 7B is a zoomed-in view of the box (730) and illustrates the deflection of the protrusions (FIG. 2, 212-1, 212-2) of the attachment device (106) from the outer portion of the mold (726). As can be seen in FIG. 7B, during removal, the protrusions (212-1, 212-2) deflect to pass through the opening of the V-shaped recession that forms the V-shaped attachment device (FIG. 1, 106). This deflection of the protrusions (212-1, 212-2) allows for the undercutting, or V-shape, of the attachment device (106) which shape is not otherwise possible with molding techniques.

Figure 8:
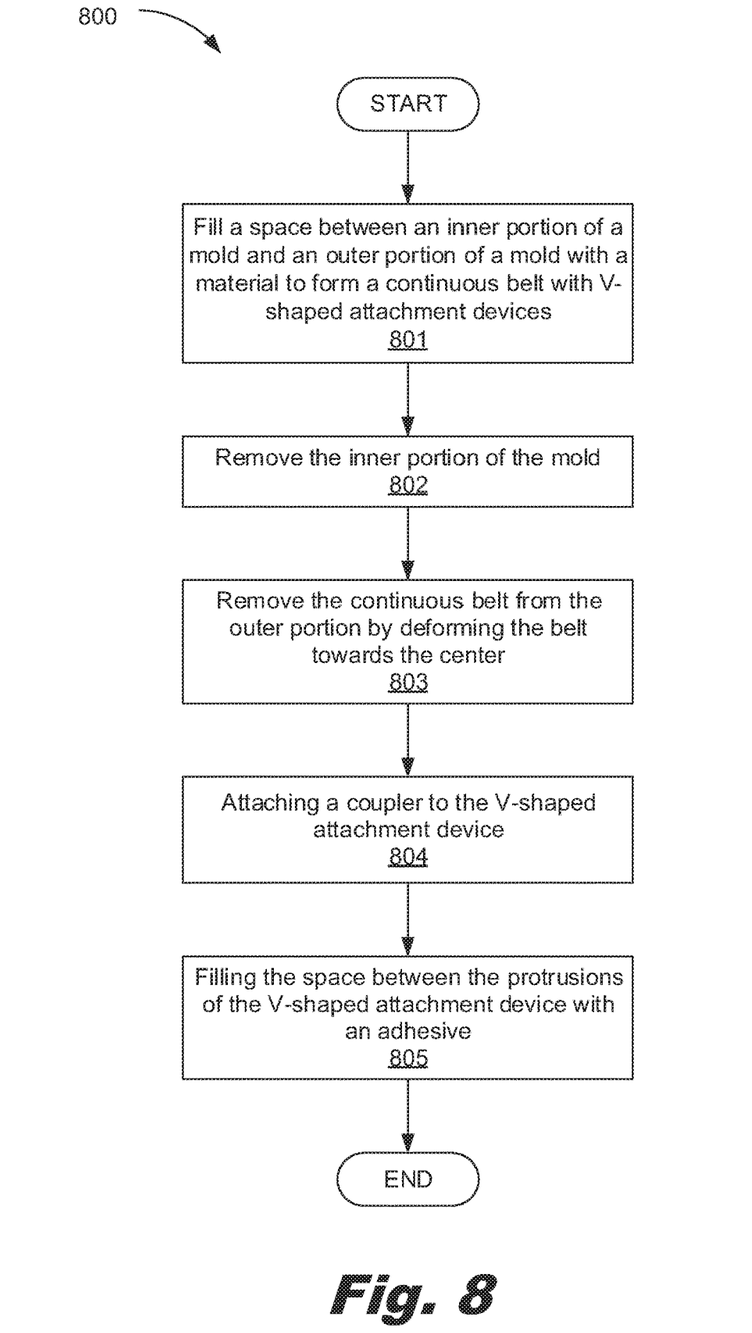
FIG. 8 is a flowchart of a method for forming a continuous belt with V-shaped attachment devices, according to another example of the principles described herein.

FIG. 8 is a flowchart of a method (800) for forming a continuous belt (FIG. 1, 100) with V-shaped attachment devices (FIG. 1, 106), according to another example of the principles described herein. According to the method (800), a space between an inner portion (FIG. 7A, 728) of a mold and an outer portion (FIG. 7A, 726) of a mold is filled (block 801) with a material to form a continuous belt (FIG. 1, 100) with V-shaped attachment devices (FIG. 1, 106). This may be performed as described above in connection with FIG. 6. The inner portion (FIG. 7A, 728) is then removed (block 802) and the continuous belt (FIG. 1, 100) is removed (block 803) towards the center of the belt (FIG. 1, 100) in the space previously occupied by the inner portion (FIG. 7A, 728). In so doing, the protrusions (FIG. 2, 212-1, 212-2) of the attachment device (FIG. 1, 106) deflect inward and then return to their shape once the belt (FIG. 1, 100) is removed from the outer portion (FIG. 7A, 726) of the mold. These operations may be performed as described above in connection with FIG. 6.

A coupler (FIG. 4, 416) is then attached (block 804) to the V-shaped attachment device (FIG. 1, 106). For example, the coupler (FIG. 4, 416) may be slid over the top of the V-shaped attachment device (FIG. 1, 106), during such an operation, the protrusions (FIG. 2, 212-1, 212-2) may be bent so as to allow the coupler (FIG. 4, 416) to slide over them. As described above, the coupler (FIG. 4, 416) provides an attachment between the belt (FIG. 1, 100) and an object to be moved by the belt (FIG. 1, 100).

The space between the protrusions (FIG. 2, 212-1, 212-2) may be filled (block 805) with an adhesive (FIG. 5, 524) to prevent the inward deflection of the protrusions (FIG. 2, 212-1, 212-2) during use, thus increasing the mechanical interference and mechanical retention of the attachment device (FIG. 1, 106) and the coupler (FIG. 4, 416). In other examples, instead of an adhesive (FIG. 5, 524), another spacing device, such as cross supports could be placed between the protrusions (FIG. 2, 212-1, 212-2) to similarly prevent the inward deflection of the protrusions (FIG. 2, 212-1, 212-2). In some examples, if an adhesive (FIG. 5, 524) is not used, or if an adhesive is used, a securing device (FIG. 4, 422) can be placed to further strengthen the coupling between the coupler (FIG. 4, 416) and the attachment device (FIG. 1, 106).

As described above, the length of the mold may be such that multiple continuous belts (FIG. 1, 100) can be formed from a single use of the mold. In this example, the length of material can be sliced to form multiple continuous belts (FIG. 1, 100).

Certain examples of the present disclosure are directed to systems and methods for moving an object that 1) maintains a simplicity in manufacturing the belts; 2) maintains low cost in fabricating the belts; and 3) provides enhanced coupling between an object and the belt via the V-shaped attachment devices. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. An object transportation device comprising:
 a continuous belt having an inner surface and an outer surface, wherein the inner surface is to interact with a belt transport system; and
 a number of V-shaped attachment devices disposed on the outer surface wherein:
 an object is to attach to the belt via a V-shaped attachment device; and
 the V-shaped attachment device comprises two angled protrusions extending from the outer surface from a common joint, wherein a width of a protrusion is less than half a width of the common joint.

2. The device of claim 1, wherein the number of V-shaped attachment devices are integrally attached to the continuous belt.

3. The device of claim 1, wherein the continuous belt is formed of a compliant material.

4. The device of claim 1, wherein:
 the inner surface comprises a number of teeth to interact with the belt transport system; and
 the V-shaped attachment device and common joint are aligned with a corresponding tooth.

5. An object transportation system comprising:
 a number of rollers to move a continuous belt along a belt path, a roller comprising a number of roller teeth;
 the continuous belt to pass over the number of rollers, the continuous belt comprising:
 an inner surface having a number of belt teeth to interact with the number of roller teeth to move the continuous belt along the belt path;
 an outer surface comprising a number of V-shaped attachment devices having two angled protrusions that angle away from one another, the number of V-shaped attachment devices to interact with a number of objects and move the number of objects along the belt path; and
 a coupler to removably join an object to a V-shaped attachment device, wherein the coupler has:
 a shape to surround the V-shaped attachment device and to couple the coupler to the V-shaped attachment device; and an object attachment device to couple the object to the coupler.

6. The system of claim 5, wherein the coupler comprises a number of ridges along surfaces that contact the V-shaped attachment device to secure the coupler to the V-shaped attachment device.

7. The system of claim 5, further comprising a securing device to secure the coupler to the V-shaped attachment device.

8. The system of claim 5, further comprising a spacing device to maintain an angle between protrusions of the V-shaped attachment device.

9. The system of claim 5, wherein the system is used in a printer.

10. A method for forming a continuous belt with V-shaped attachment devices comprising:

filling a space between an inner portion of a mold and an outer portion of a mold with a material to form the continuous belt with V-shaped attachment devices, wherein the outer portion of the mold comprises a number of V-shaped recessions to define the V-shaped attachment devices;

removing the inner portion of the mold;

removing the continuous belt from the outer portion of the mold by deforming the continuous belt towards a center of the continuous belt, wherein protrusions of the V-shaped attachment devices deflect inward to facilitate removal from the V-shaped recession of the outer portion.

11. The method of claim 10, further comprising attaching a coupler to a V-shaped attachment device to allow an object to be coupled to the continuous belt through the coupler.

12. The method of claim 11, further comprising filling a space between protrusions of a V-shaped attachment device with adhesive to maintain an angle between the protrusions during use.

13. The method of claim 11, wherein:

a length of the mold is sufficient to form multiple continuous belts; and the method further comprises forming multiple continuous belts by dividing the material along the length.

* * * * *

UNITED STATES PATENT AND TRADEMARK OFFICE
CERTIFICATE OF CORRECTION

PATENT NO. : 10,507,979 B2
APPLICATION NO. : 15/759933
DATED : December 17, 2019
INVENTOR(S) : Bruce G Johnson et al.

It is certified that error appears in the above-identified patent and that said Letters Patent is hereby corrected as shown below:

On the Title Page

In Column 1, item (72), Inventors, Line 1, delete "LaCenter," and insert -- La Center, --, therefor.

Signed and Sealed this
Seventeenth Day of March, 2020

Andrei Iancu
*Director of the United States Patent and Trademark Office*